(12) United States Patent
Arikuma et al.

(10) Patent No.: US 6,868,296 B1
(45) Date of Patent: Mar. 15, 2005

(54) AUDIO COMPONENT SYSTEM

(75) Inventors: Shoji Arikuma, Neyagawa (JP); Hideharu Toda, Katano (JP)

(73) Assignees: Sanyo Electric Co., Ltd., Moriguchi (JP); Sanyo Technosound Co., Ltd., Daito (JP)

( * ) Notice: Subject to any disclaimer, the term of this patent is extended or adjusted under 35 U.S.C. 154(b) by 0 days.

(21) Appl. No.: 09/579,273

(22) Filed: May 26, 2000

(30) Foreign Application Priority Data

May 28, 1999 (JP) .......................................... 11-149428

(51) Int. Cl.[7] .............................................. G06F 17/00
(52) U.S. Cl. ................................... 700/94; 340/825.24
(58) Field of Search ...................... 700/94; 340/825.24, 340/825.25, 384.7, 2.1, 2.8; 348/705; 359/147; 381/77, 80, 81, 123, 104, 102, 109, 94.5

(56) References Cited

U.S. PATENT DOCUMENTS

| | | | | |
|---|---|---|---|---|
| 5,204,909 A | * | 4/1993 | Cowan | 381/106 |
| 5,208,865 A | * | 5/1993 | Friske et al. | 381/94.5 |
| 5,243,640 A | * | 9/1993 | Hadley et al. | 455/426.1 |
| 5,491,839 A | * | 2/1996 | Schotz | 455/39 |
| 5,621,659 A | * | 4/1997 | Matsumoto et al. | 364/514 |
| 6,492,909 B1 | * | 12/2002 | Washikawa et al. | 340/825.25 |

FOREIGN PATENT DOCUMENTS

| | | |
|---|---|---|
| JP | 3-290866 | 12/1991 |
| JP | 7-131867 | 5/1995 |
| JP | 10-233056 | * 9/1998 |

* cited by examiner

*Primary Examiner*—Duc Nguyen
*Assistant Examiner*—Lun-See Lao
(74) *Attorney, Agent, or Firm*—Armstrong, Kratz, Quintos, Hanson & Brooks, LLP

(57) ABSTRACT

In a system which comprises a plurality of audio components 2 to 5 connected to an amplifier unit 1 and wherein an audio signal from one component selected by a selector 17 is fed to a speaker 6 for the production of sound, a control circuit 15 of the amplifier unit 1 and each of control circuits 22, 32, 43, 53 of the respective components are connected to each other by a control bus 7. The amplifier unit 1 transmits a call signal to each of the components 2 to 5 and checks whether an answer signal is received therefrom in response to the call signal. When the component failing to return the answer signal is selected by the selector 17, the unit 1 turns on a muting circuit 16. This eliminates the likelihood that the speaker will produce noise when the sound volume is increased while a nonconnected component is selected.

5 Claims, 6 Drawing Sheets

AUDIO COMPONENT SYSTEM

FIELD OF THE INVENTION

The present invention relates to audio component systems which comprise a plurality of components such as a tuner, CD player, tape recorder and MD player, and which are adapted to select one component from among these components to amplify an audio signal output from the selected component and produce sound by a speaker.

BACKGROUND OF THE INVENTION

For example, FIG. 6 shows an audio component system which comprises audio components, i.e., a tuner 20, CD player 30, tape recorder 40 and MD player 50, which are connected to an amplifier unit 9. An audio signal sent out from one audio output component selected by the amplifier unit 9, e.g., from the CD player 30, is amplified and delivered as sound from a speaker 6 connected to the output terminal of the amplifier unit 9. Further one audio output component selected by the amplifier unit 9, e.g., the tuner 20, feeds an audio signal to one audio input component, e.g., to the MD player 50, which records the audio signal. The audio components 20, 30, 40, 50 have respective control circuits 21, 31, 41, 51 each adapted to control the operation of the component.

The amplifier unit 9 has a plurality of signal input terminals a, b, c, d having connected thereto signal output lines 81 to 84 extending from the audio output components 20, 30, 40, 50, and a plurality of signal output terminals e, f having connected thereto signal input lines 85, 86 extending from the audio input components 40, 50.

The signal input terminals a, b, c, d are connected via a selector 91 to a signal processing system 4, comprising a preamplifier 92, audio signal processing circuit 93 and post amplifier 94, and an audio signal is delivered to the speaker 6 via the signal processing system. The audio signal processing circuit 93 is adapted to process signals for volume adjustment and tone adjustment as specified by the user's manipulation. The output terminal of the preamplifier 92 is connected to the signal output terminals e, f through a plurality of on-off switches 95, 96, and an audio signal is delivered from the terminal e or f to the tape recorder 40 or MD player 50.

The selector 91 and the on-off switches 95, 96 are controlled by a control circuit 98 to realize an operation in accordance with the manipulation of an input unit 97 by the user. For example, when the audio signal to be produced by the CD player 30 is to be recorded on an MD (mini disk) by the MD player 50, the input unit 97 is manipulated to select the CD player 30 as a signal output component and the MD player 50 as a signal input component, whereupon the selector 91 is switched to the input terminal connected to the CD player 30, and the on-off switch 96 connected to the MD player 50 is closed.

Consequently, the audio signal from the CD player 30 is fed to the MD layer 50 by way of the selector 91, preamplifier 92 and on-off switch 96 and recorded on the MD.

However, the control circuit 98 of the amplifier unit 9 is unable to recognize whether all the components are connected to the amplifier unit 9 and whether all the components are energized to hold the control circuits thereof active, so that the conventional audio component system described has the problem that if the user manipulates the input unit 14 to increase the volume of the output sound, with the selector 91 selecting a signal input terminal actually connected to no component, a loud noise will be produced by the speaker 6 to cause discomfort.

SUMMARY OF THE INVENTION

Accordingly, an object of the present invention is to provide an audio component system which is unlikely to produce noise even if the volume of the output sound is increased while a nonconnected component or unenergized component is selected.

The present invention provides an audio component system which comprises a plurality of components for outputting audio signals, and a signal processing control unit connected to the components, the signal processing control unit comprising a plurality of signal input terminals a to d for receiving audio signals from the components, selector means 17 connected to the signal input terminals for selecting the audio signal received by desired one of the signal input terminals, a signal processing circuit for processing the selected signal as required by an operation including amplification and outputting the resulting audio signal, and a control circuit 15 for changing over the selector means in accordance with a manipulation by the user.

The control circuit 15 of the signal processing control unit and a control circuit 22, 32, 43 or 53 of each of the components are connected to each other for communication.

The control circuit 15 of the signal processing control unit comprises signal transmitting means for transmitting at a suitable time a call signal to the control circuit of at least one of the components which is to be checked for connection or nonconnection, means for checking whether an answer signal is received in response to the call signal, and muting means for reducing substantially to zero the sound volume of the audio signal to be output from the signal processing circuit when the audio signal selected by the selector means is from the component not responding with the answer signal.

The control circuit of each component comprises signal response means for sending the answer signal to the signal processing control unit in response to the call signal from the control circuit 15 of the signal processing control unit.

When a call signal is transmitted to the component as actually connected to the signal processing control unit and energized, the control circuit of the component sends an answer signal to the control circuit 15 of the processing control unit in response to the call signal. The reception of the answer signal enables the control circuit 15 to recognize that the component concerned is actually connected to the processing control unit and energized.

On the other hand, when a call signal is transmitted to the component which is not actually connected to the signal processing control unit or is not energized, no answer signal is given. Accordingly, this makes the control circuit 15 of the processing control unit recognize that the component concerned is not connected to the control unit actually or is unenergized.

Based on the recognition, the signal processing control unit operates the muting means to reduce the sound volume of the audio signal to be output from the signal processing circuit substantially to zero. It is therefore unlikely that the speaker 6 will give off a loud noise even if the volume is increased by the user manipulating an input unit 14.

Stated more specifically, the signal transmitting means of the control circuit 15 of the signal processing control unit transmits the call signal to the control circuits of all the components when the processing control unit is energized. This enables the control circuit 15 to check all the components as to whether the component is connected to the control unit and whether the component is energized.

Alternatively, when one of the signal input terminals is selected by the selector means, the signal transmitting means of the control circuit 15 of the signal processing control unit transmits the call signal to the control circuit of the component which is connected to the selected signal input terminal. Every time one component is selected by the selector means, the selected component can be checked for connection to the signal processing control circuit and also for energization or unenergization in this way.

Further alternatively, the signal transmitting means of the control circuit 15 of the signal processing control unit transmits the call signal to the control circuits of all the components in a predetermined cycle. In this way, all the components can be checked periodically for connection to the signal processing control circuit and also for energization or unenergization.

The audio component system of the present invention is unlikely to produce noise even if the volume of audio output is increased while a nonconnected component or unenergized component is selected.

DETAILED DESCRIPTION OF EMBODIMENTS

Embodiments of the present invention will be described below in detail with reference to the drawings.

Figure 1:
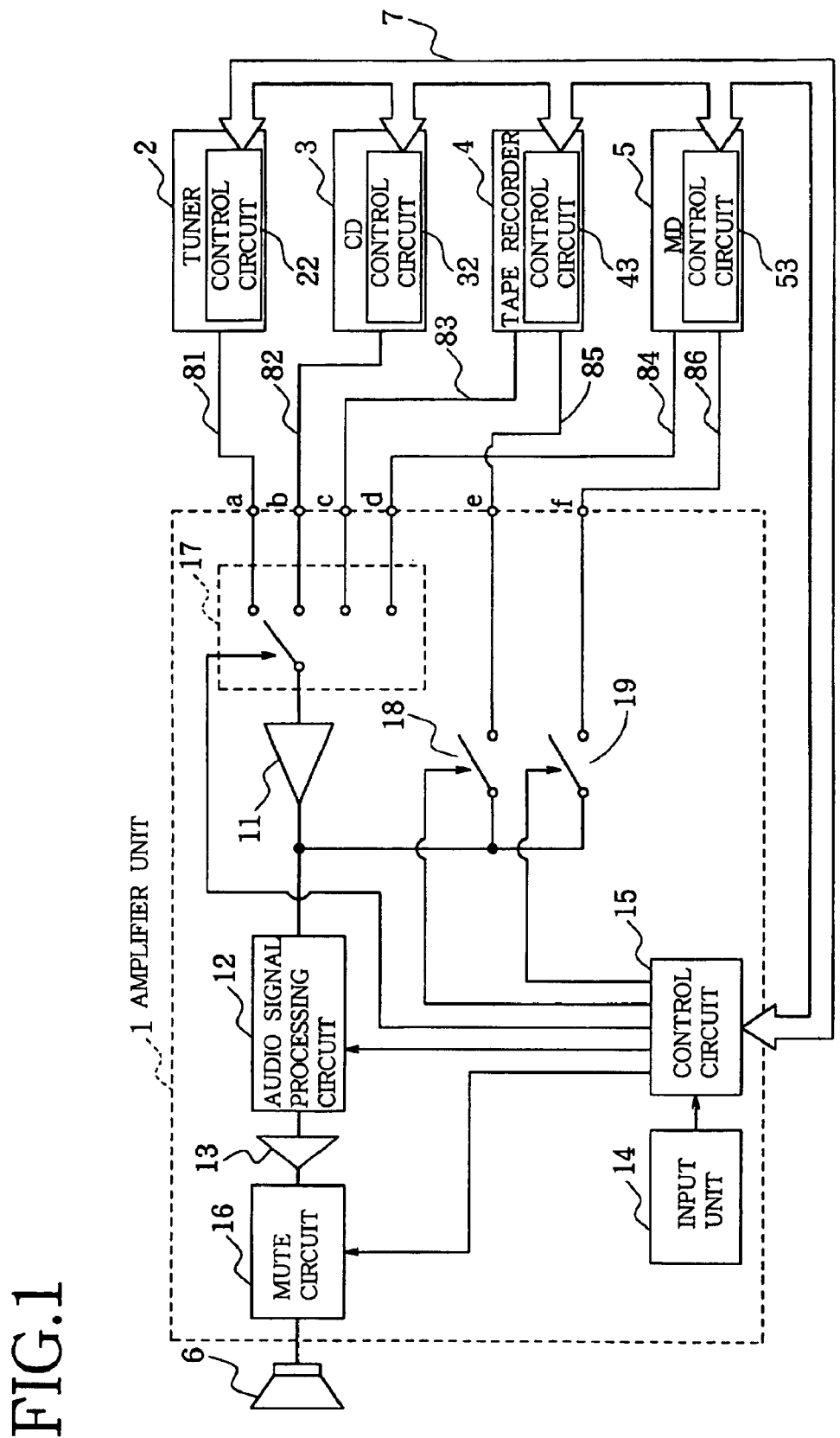
FIG. 1 is a block diagram showing the construction of an audio component system of the invention.

FIG. 1 shows an audio component system of the present invention which comprises audio components, i.e., a tuner 2, CD player 3, tape recorder 4 and MD player 5, which are connected to an amplifier unit 1. An audio signal sent out from one audio output component selected by the amplifier unit 1, e.g., from the CD player 3, is amplified and delivered as sound from a speaker 6 connected to the output terminal of the amplifier unit 1. Further one audio output component selected by the amplifier unit 1, e.g., the tuner 2, feeds an audio signal to one audio input component, e.g., to the MD player 5, which records the audio signal. The audio components 2, 3, 4, 5 have respective control circuits 22, 32, 43, 53 each adapted to control the operation of the component.

The amplifier unit 1 has a plurality of signal input terminals a, b, c, d having connected thereto signal output lines 81 to 84 extending from the audio output components 2, 3, 4, 5, and a plurality of signal output terminals e, f having connected thereto signal input lines 85, 86 extending from the audio input components 4, 5.

The signal input terminals a, b, c, d are connected via a selector 17 to a signal processing system comprising a preamplifier 11, audio signal processing circuit 12 and post amplifier 13. Connected to the output terminal of the post amplifier 13 is a muting circuit 16 for silencing the sound output, for example, during the tuning operation of the tuner 2. The audio signal passed through the muting circuit 16 is delivered to the speaker 6. The audio signal processing circuit 12 is adapted to process signals for volume adjustment and tone adjustment as specified by the user's manipulation The output terminal of the preamplifier 11 is connected to the signal output terminals e, f through a plurality of on-off switches 18, 19, and an audio signal is delivered from the terminal e or f to the tape recorder 4 or MD player 5.

The selector 17, the on-off switches 18, 19 and muting circuit 16 are controlled by a control circuit 15 to realize an operation in accordance with the manipulation of an input unit 14 by the user.

The control circuit 15 of the amplifier unit 1 and each of the control circuits 22, 32, 43, 53 of the components 2 to 5 are connected to each other by a control bus 7 for communication therebetween as will be described later, such that the control circuit 15 turns on the muting circuit 16 to mute the audio signal to be delivered to the speaker 6 when the audio signal from the component which is not connected to the amplifier unit or unenergized is selected by-the selector 17.

For example, when the audio signal to be produced by the CD player 3 is to be recorded on an MD by the MD player 5, the input unit 14 is manipulated to select the CD player 3 as a signal output component and the MD player 5 as a signal input component, whereupon the selector 17 is switched to the input terminal connected to the CD player 3, and the on-off switch 19 connected to the MD player 5 is closed.

Consequently, the audio signal from the CD player 3 is fed to the MD layer 5 by way of the selector 17, preamplifier 11 and on-off switch 19 and recorded on the MD.

Figure 2:
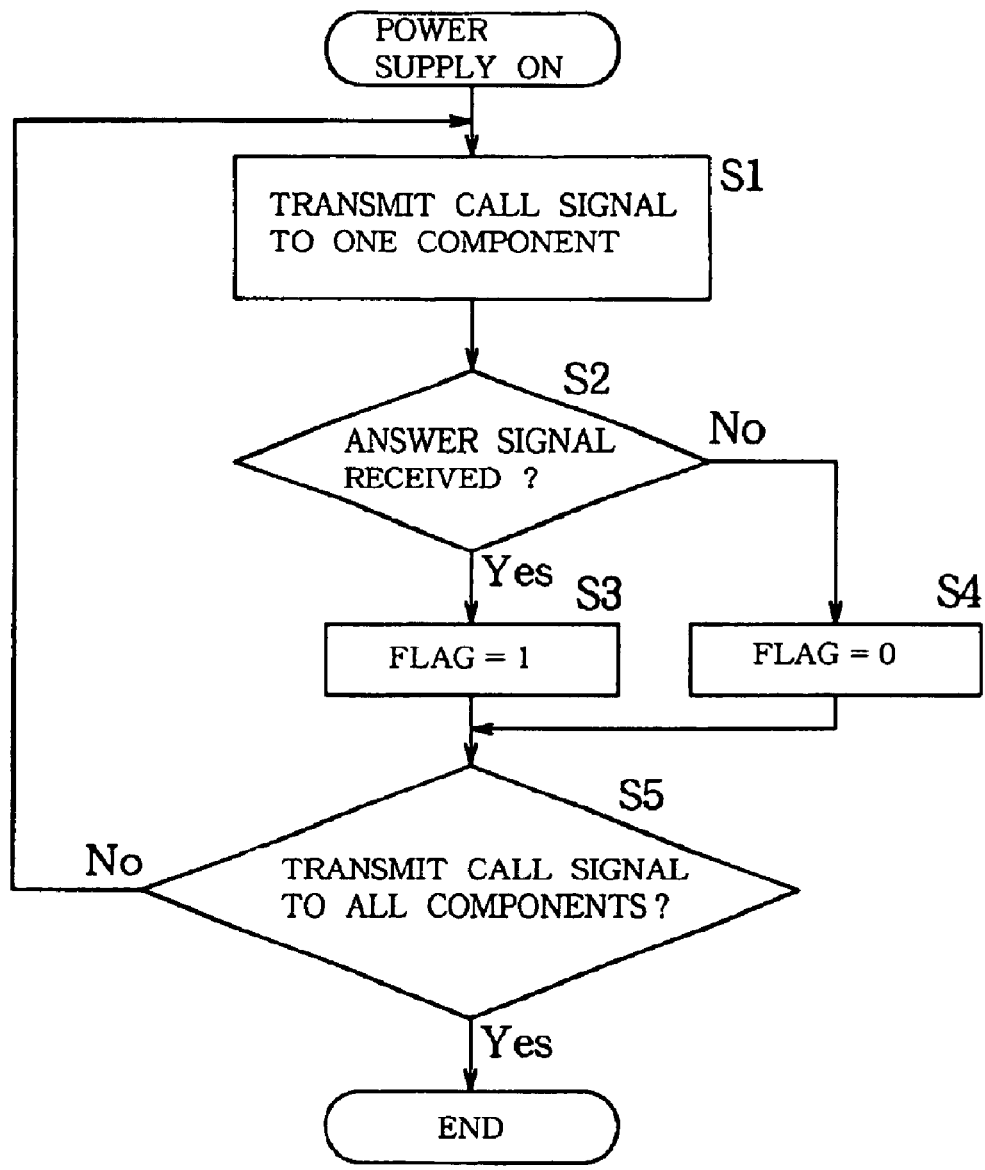
FIG. 2 is a flow chart showing the checking procedure to be performed by a control circuit of an amplifier unit.

FIG. 2 shows the operation to be performed by the control circuit 15 when the amplifier unit 1 is energized. The control circuit transmits a call signal to one component first in step S1, and inquires in step S2 whether an answer signal is received within a predetermined period of time. When the inquiry is answered in the affirmative, step S3 follows to set a flag as to the component concerned to 1. In the absence of the answer signal, the flag as to the component is reset to 0 in step S4.

An inquiry is thereafter made in step S5 as to whether the call signal has been transmitted to all the component. If the answer is negative, the sequence returns to step S1, in which the call signal is sent to the next component. When the answer is affirmative, the procedure is terminated.

Thus, the call signal is transmitted to all the components upon energization, and the answer signal in response to the signal is received.

Figure 4:
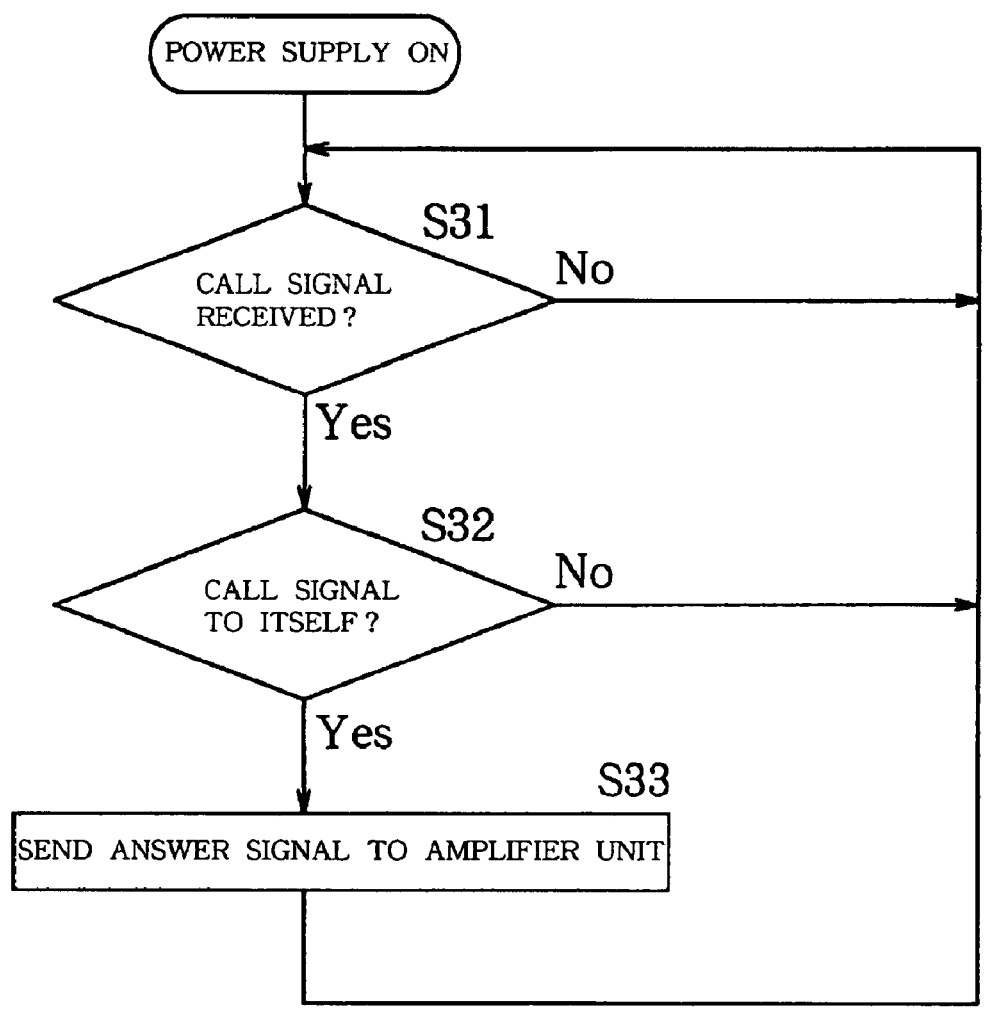
FIG. 4 is a flow chart showing the response procedure to be performed by control circuits of components.

On the other hand, FIG. 4 shows the operation to be performed by the control circuit of each component. After energization, an inquiry of step S31 is repeated as to whether the call signal has been received. When the answer is affirmative, step S32 follows to inquire whether the call signal is addressed to itself. When the answer is affirmative, an answer signal is sent to the amplifier unit 1 in step S33, followed by step S31 again. If the answer to the inquiry of step S32 is negative, step S31 also follows to wait for the reception of call signal.

In this way, the answer signal is returned to the amplifier unit 1 for the component which is connected to the unit 1 and energized.

By executing the procedures of FIGS. 2 and 4, respective flags are set to 1 for the components connected to the amplifier unit 1 and energized when the amplifier unit 1 is energized, while flags are reset to 0 respectively for the other components which are not connected or unenergized. Accordingly, the components can be thereafter checked for connection and energization by reference to the flags of the components.

Figure 3:
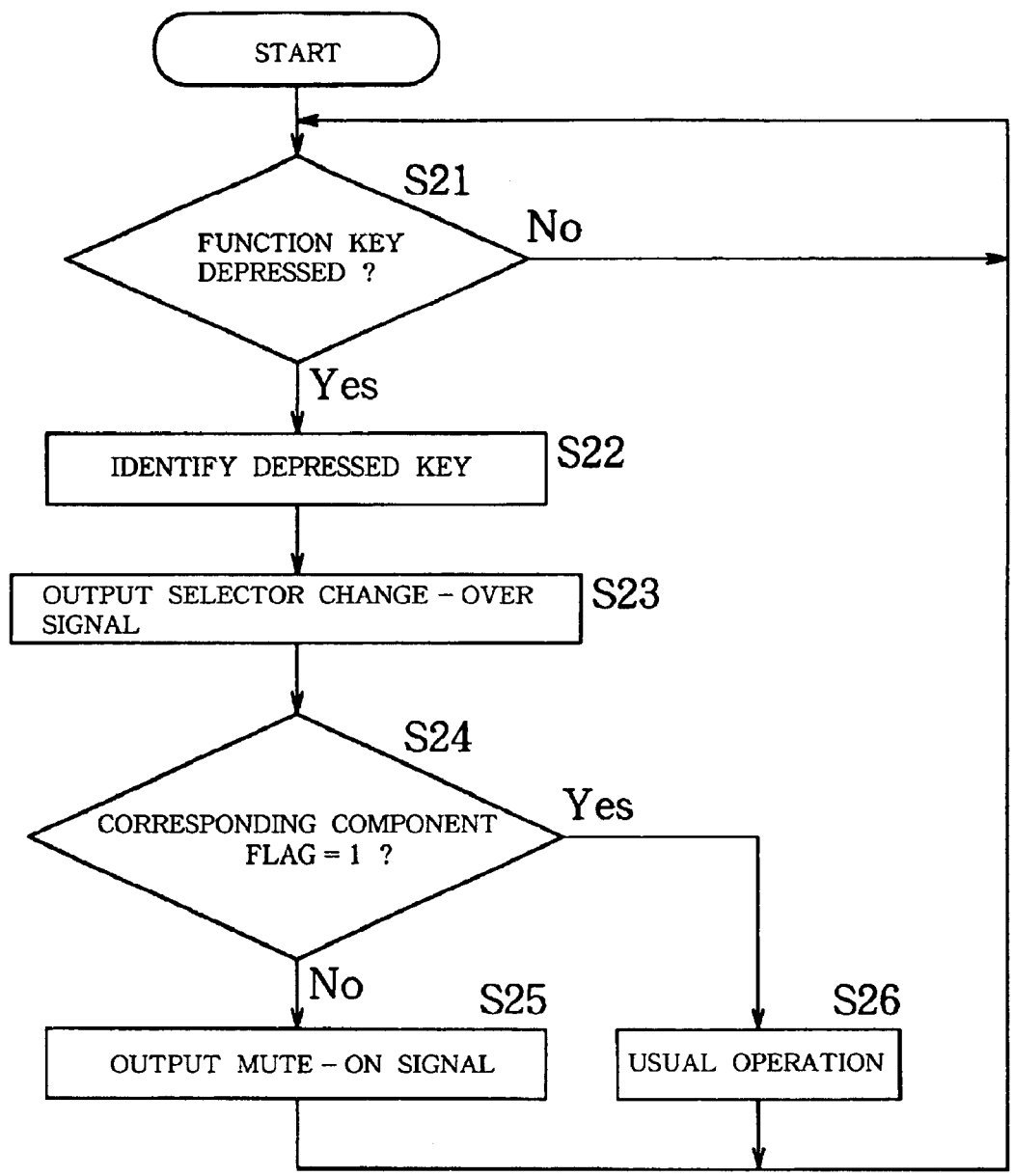
FIG. 3 is a flow chart showing the mute on/off control procedure to be performed by the control circuit of the amplifier unit.

FIG. 3 shows the control procedure to be performed by the control circuit 15 when one of the audio output or input components is selected by manipulating a function key on the input unit 14 of the amplifier unit 1.

First, the circuit 15 inquires in step S21 whether some function key has been depressed. If the answer is affirmative, step S22 follows to identify the particular component to be selected, as indicated by the depressed function key. Next in step S23, a change-over signal is prepared for switching the selector 17 to the identified component and is fed to the selector 17.

Subsequently with reference to the contents of the foregoing flag, an inquiry is made in step S24 as to whether the flag corresponding to the component selected by the selector 17 is set to 1. When a negative answer is given to the inquiry, a mute-on signal is delivered to the muting circuit 16 in step S25, whereupon step S21 follows again to wait for the subsequent manipulation of function key. If an affirmative answer is given by step S24, step S26 follows to execute the usual operation of feeding an audio signal to the speaker 6 in a mute-off state.

The procedure of FIG. 3 is such that when one component is selected by manipulating the input unit 14 of the amplifier unit 1 and further when the selected component is not connected to the amplifier unit 1 actually or is not energized, the muting circuit 16 is turned on. This eliminates the likelihood that the speaker 6 will produce a loud noise if the user increases the volume in this state.

Figure 5:
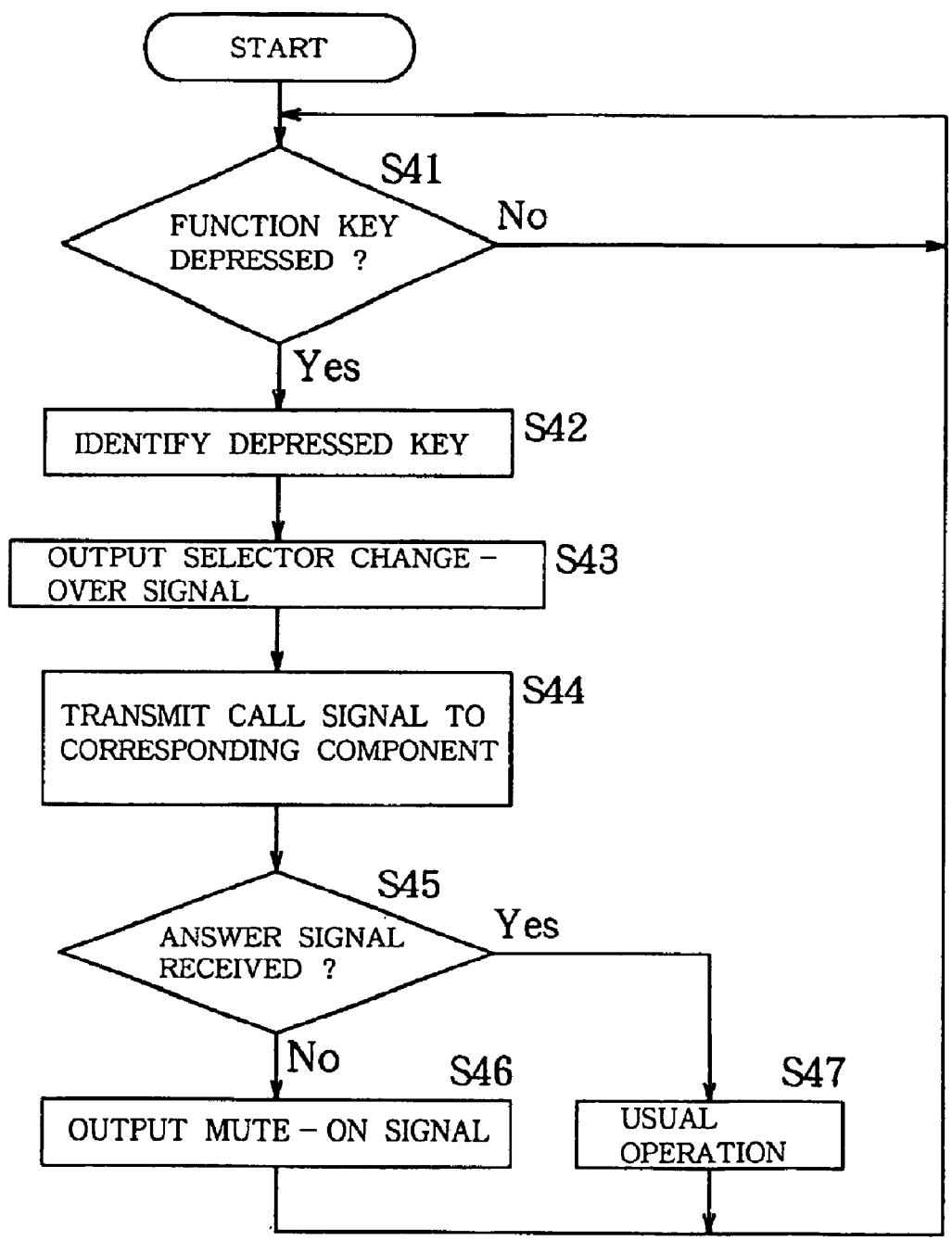
FIG. 5 is a flow chart showing another procedure to be performed by the amplifier unit control circuit and substituting for the procedures of FIGS. 2 and 3.
Figure 6:
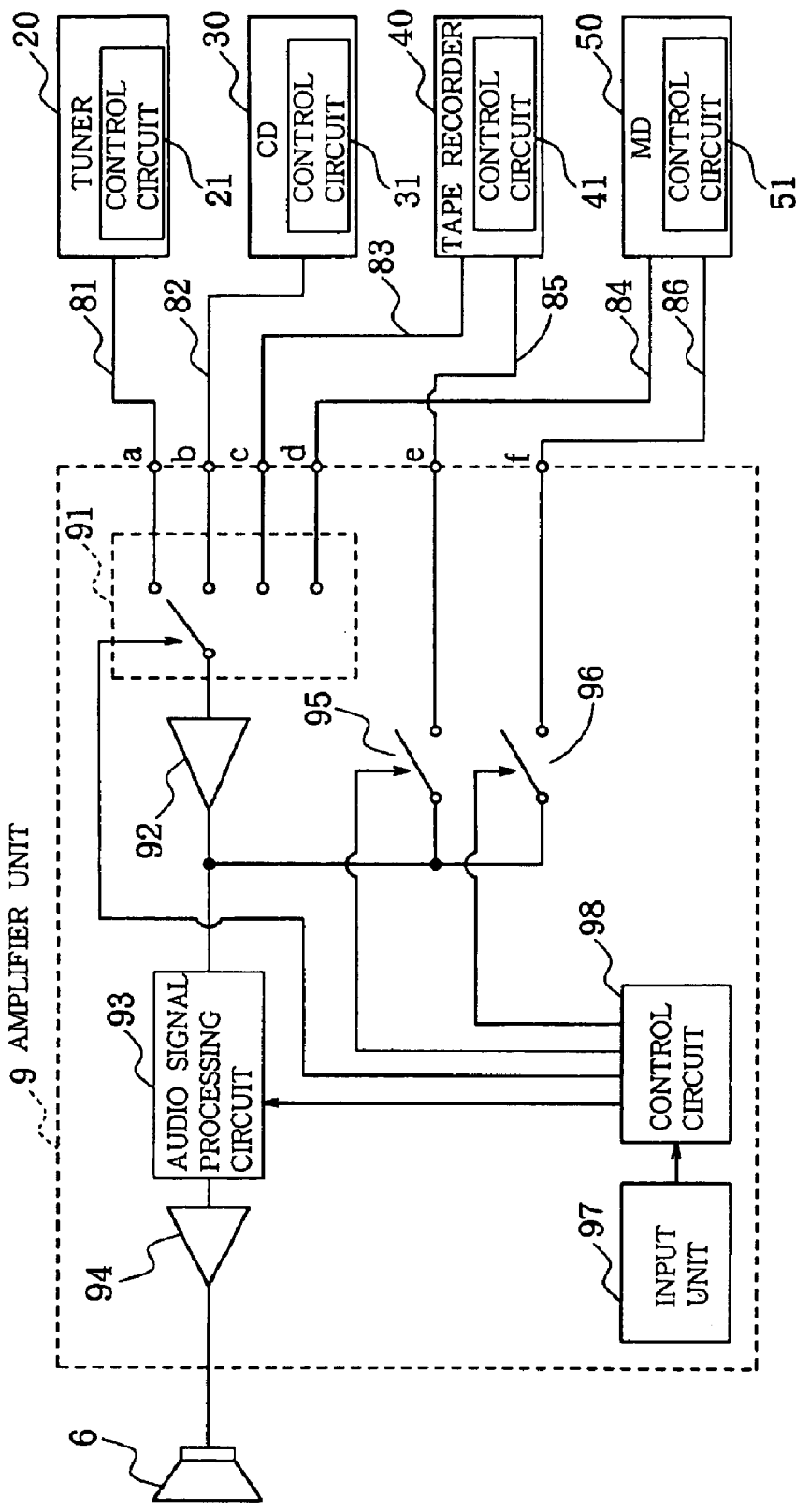
FIG. 6 is a block diagram showing the construction of a conventional audio component system.

FIG. 5 shows another control procedure to be performed by the control circuit 15 of the amplifier unit 1 and substituting for the procedures of FIGS. 2 and 3.

First, the control circuit 15 inquires in step S41 whether some function key has been depressed. If the answer is affirmative, step S42 follows to identify the particular component to be selected, as indicated by the depressed function key. Next in step S43, a change-over signal is prepared for switching the selector 17 to the identified component and is fed to the selector 17.

Subsequently, a call signal is transmitted to the component corresponding to the depressed function key in step S44, and an inquiry is thereafter made in step S45 as to whether an answer signal is received within a predetermined period. When a negative answer is given to the inquiry, a mute-on signal is fed to the muting circuit 16 in step S46, whereupon step S41 follows again to wait for the subsequent manipulation of function key. If an affirmative answer is given by step S45, step S47 follows to execute the usual operation of feeding an audio signal to the speaker 6 in a mute-off state.

The procedure of FIG. 5 is such that every time one component is selected by manipulating the input unit 14 of the amplifier unit 1, the component is checked as to whether it is actually connected to the amplifier unit 1 and energized. If the component is not connected to the unit 1 actually or unenergized, the muting circuit 16 is turned on, with the result that even if the user increases the volume in this state, the speaker 6 is unlikely to give off a loud noise.

The system of the invention is not limited to the foregoing embodiments in construction but can be modified variously by one skilled in the art without departing from the spirit of the invention as set forth in the appended claims. For example, the component is checked for connection or non-connection and also for energization or unenergization when the amplifier unit 1 is energized, or when the selector 17 of the amplifier unit 1 is changed over, whereas these methods of checking is not limitative; the checking procedure can be repeated in a predetermined control cycle after the amplifier unit 1 is energized. Alternatively, these three methods can be used in a suitable combination.

What is claimed is:

1. An audio component system comprising (a) a plurality of components for outputting audio signals,
   (b) a signal processing control unit connected to the components, the signal processing control unit comprising
      a plurality of signal input terminals for receiving audio signals from the components,
      selector means connected to the signal input terminals for selecting the audio signal received by a desired one of the signal input terminals,
      a signal processing circuit for processing the selected signal and outputting the resulting audio signal, and
   (c) a control circuit of the signal processing control unit connected to a respective control circuit of each of the components the control circuit of the signal processing control unit comprising signal transmitting means for automatically transmitting at a suitable time a call signal to the control circuit of at least one of the components which is to be checked for connection or non-connection, the control circuit of each component comprising signal response means for sending an answer signal to the signal processing control unit in response to the call signal from the control circuit of the signal processing control unit;
   (d) muting means, comprised in the signal processing control unit, for automatically reducing substantially to zero the sound volume of the audio signal selected by the control circuit which is to be output from the signal processing circuit when the audio signal selected by the selector means is from the component not responding to the answer signal.

2. The audio component system according to claim 1 wherein the signal transmitting means of the control circuit of the signal processing control unit transmit the call signal to the control circuits of all the components when the signal processing control unit is energized.

3. The audio component system according to claim 1 wherein when one of the signal input terminals is selected by the selector means, the signal transmitting means of the control circuit of the signal processing control unit transmits the call signal to the control circuit of the component connected to the selected signal input terminal.

4. The audio component system according to claim 1 wherein the signal transmitting means of the control circuit of the signal processing control unit transmit the signal to the control circuits of all the components in a predetermined cycle.

5. The audio component system according to claim 1, wherein the signal processing circuit amplifies the signal.

* * * * *

UNITED STATES PATENT AND TRADEMARK OFFICE
CERTIFICATE OF CORRECTION

PATENT NO. : 6,868,296 B1
DATED : March 15, 2005
INVENTOR(S) : Arikuma et al.

It is certified that error appears in the above-identified patent and that said Letters Patent is hereby corrected as shown below:

Column 6,
Line 49, change "transmit the" to be -- transmits the --
Line 60, change "transmit the signal" to be -- transmits the call signal --

Signed and Sealed this

Nineteenth Day of July, 2005

JON W. DUDAS
*Director of the United States Patent and Trademark Office*